United States Patent
Hilbert et al.

(10) Patent No.: US 11,378,187 B2
(45) Date of Patent: Jul. 5, 2022

(54) ARTICULATING CANTILEVERED HYDROSTATIC SEAL

(71) Applicant: United Technologies Corporation, Farmington, CT (US)

(72) Inventors: Brian F. Hilbert, Coventry, CT (US); Daniel L. Gysling, South Glastonbury, CT (US); Eric A. Grover, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 57 days.

(21) Appl. No.: 16/239,231

(22) Filed: Jan. 3, 2019

(65) Prior Publication Data
US 2020/0217421 A1    Jul. 9, 2020

(51) Int. Cl.
*F16J 15/44* (2006.01)
*F01D 11/00* (2006.01)

(52) U.S. Cl.
CPC ........... *F16J 15/441* (2013.01); *F01D 11/003* (2013.01)

(58) Field of Classification Search
CPC ......... F16J 15/442; F16J 15/441; F01D 5/02; F01D 9/02; F01D 11/025; F01D 11/12; F01D 11/003; F05B 2240/57
See application file for complete search history.

(56) References Cited

U.S. PATENT DOCUMENTS

| | | | |
|---|---|---|---|
| 1,187,212 A * | 6/1916 | Westinghouse | F16J 15/441 277/413 |
| 3,594,010 A * | 7/1971 | Warth | F01D 11/025 277/413 |
| 3,847,403 A * | 11/1974 | Thiesler | B65G 39/09 277/420 |
| 4,017,088 A * | 4/1977 | Lerjen | F16J 15/441 277/416 |
| 4,213,656 A * | 7/1980 | Olschewski | E21B 10/25 384/480 |
| 4,428,587 A * | 1/1984 | Forch | F16J 15/008 277/424 |
| 4,998,739 A | 3/1991 | Weiler | |
| 5,626,347 A * | 5/1997 | Ullah | F01D 11/003 277/399 |

(Continued)

FOREIGN PATENT DOCUMENTS

| | | | |
|---|---|---|---|
| EP | 3009611 A1 | 4/2016 | |
| EP | 3009612 A1 | 4/2016 | |

(Continued)

OTHER PUBLICATIONS

European Search Report Application No. 19220241.4; dated: Jun. 17, 2020.

(Continued)

*Primary Examiner* — Eugene G Byrd
(74) *Attorney, Agent, or Firm* — Cantor Colburn LLP

(57) ABSTRACT

A hydrostatic seal configured to be disposed between relatively rotatable components is provided. The seal includes a seal housing. The seal also includes a shoe having a first axially extending segment, a second axially extending segment, and a radially extending segment joining the first and second axially extending segments, the shoe cantilevered to the seal housing.

20 Claims, 2 Drawing Sheets

(56) References Cited

U.S. PATENT DOCUMENTS

| | | | |
|---|---|---|---|
| 6,250,640 B1 | 6/2001 | Wolfe et al. | |
| 6,338,490 B1 | 1/2002 | Bainachi | |
| 6,669,443 B2 | 12/2003 | Burnett et al. | |
| 7,410,173 B2* | 8/2008 | Justak | F01D 11/00 277/355 |
| 7,896,352 B2* | 3/2011 | Justak | F16J 15/442 277/411 |
| 8,002,285 B2* | 8/2011 | Justak | F01D 11/02 277/412 |
| 8,172,232 B2* | 5/2012 | Justak | F01D 11/025 277/411 |
| 8,474,827 B2 | 7/2013 | Grondahl | |
| 8,600,707 B1 | 12/2013 | El-Aini et al. | |
| 8,641,045 B2* | 2/2014 | Justak | F16J 15/442 277/412 |
| 8,919,781 B2* | 12/2014 | Justak | F01D 11/025 277/411 |
| 9,045,994 B2* | 6/2015 | Bidkar | F01D 11/02 |
| 9,115,810 B2* | 8/2015 | Bidkar | F16J 15/447 |
| 9,255,642 B2 | 2/2016 | Bidkar et al. | |
| 9,359,908 B2* | 6/2016 | Bidkar | F01D 11/02 |
| 9,587,746 B2* | 3/2017 | Bidkar | F01D 11/025 |
| 9,988,921 B2 | 6/2018 | Wilson et al. | |
| 10,030,531 B2* | 7/2018 | Peters | F01D 5/02 |
| 10,094,232 B2 | 10/2018 | McCaffrey et al. | |
| 10,208,615 B2 | 2/2019 | Peters | |
| 2003/0080513 A1* | 5/2003 | Kirby | F16J 15/48 277/416 |
| 2005/0200080 A1* | 9/2005 | Baghdadi | F16J 15/406 277/409 |
| 2008/0122183 A1 | 5/2008 | Braun et al. | |
| 2008/0265513 A1 | 10/2008 | Justak | |
| 2013/0234399 A1 | 9/2013 | Justak | |
| 2013/0241153 A1* | 9/2013 | Garrison | F16J 15/40 277/350 |
| 2014/0008871 A1* | 1/2014 | Bidkar | F04D 29/164 277/303 |
| 2014/0062024 A1 | 3/2014 | Bidkar et al. | |
| 2014/0117624 A1 | 5/2014 | Bidkar et al. | |
| 2014/0119912 A1 | 5/2014 | Bidkar et al. | |
| 2015/0159498 A1* | 6/2015 | Mukhopadhyay | F16J 15/3288 415/173.1 |
| 2016/0097294 A1 | 4/2016 | Wilson et al. | |
| 2016/0108750 A1 | 4/2016 | Wilson et al. | |
| 2016/0109025 A1 | 4/2016 | McCaffrey et al. | |
| 2016/0115804 A1 | 4/2016 | Wilson et al. | |
| 2017/0248236 A1 | 8/2017 | Simpson et al. | |
| 2017/0306780 A1* | 10/2017 | Peters | F01D 11/001 |
| 2018/0058240 A1* | 3/2018 | Chuong | F16J 15/442 |
| 2020/0217215 A1 | 7/2020 | Grover et al. | |
| 2020/0217216 A1 | 7/2020 | Grover et al. | |
| 2020/0217420 A1 | 7/2020 | Hilbert et al. | |
| 2020/0217422 A1 | 7/2020 | Grover et al. | |

FOREIGN PATENT DOCUMENTS

| | | |
|---|---|---|
| EP | 2580498 B1 | 8/2016 |
| EP | 3290756 A1 | 3/2018 |
| WO | 0155624 A1 | 8/2001 |
| WO | 2014022290 A1 | 2/2014 |
| WO | 2015147967 A1 | 10/2015 |

OTHER PUBLICATIONS

European Search Report for Application No. EP 19 21 9634; dated May 26, 2020.
European Search Report for Application No. EP 19 22 0248.
European Search Report Application No. EP 19 21 9645; dated: Jun. 4, 2020.
US Non Final Office Action dated May 29, 2020 for U.S. Appl. No. 16/239,226.
US Non Final Office Action dated May 15, 2020 for U.S. Appl. No. 16/239,611.
US Non Final Office Action dated May 29, 2020 for U.S. Appl. No. 16/239,242.
US Non Final Office Action dated May 29, 2020 for U.S. Appl. No. 16/239,616.
European Search Report for Application No. EP 19 21 9629.
EP Office Action for Application No. 19 219 629.3; dated Apr. 20, 2021.
EP Office Action for Application No. 19 220 241.4; dated May 3, 2021.

* cited by examiner

ARTICULATING CANTILEVERED HYDROSTATIC SEAL

BACKGROUND

Exemplary embodiments pertain to the art of gas turbine engines and, more particularly, to an articulating cantilevered hydrostatic seal.

Hydrostatic seals exhibit less leakage compared to traditional knife edge seals while exhibiting a longer life than brush seals. Some hydrostatic seals may be used between a stator and a rotor within a gas turbine engine. The hydrostatic seal is mounted to the stator to maintain a desired gap dimension between the hydrostatic seal and the rotor. The hydrostatic seal has the ability to 'track' the relative movement between the stator and the rotor throughout the engine operating profile when a pressure differential is developed across the seal.

Hydrostatic seals involve motion of a spring-attached shoe whose response is based on aerodynamic forces developed between the seal shoe and a rotor surface during operation. When properly designed, the hydrostatic seal will maintain tight clearances across the operating range of the engine. At operating conditions with high pressure differentials across the seal, though, the hydrostatic seal may have an inherent issue with friction that could result in the seal "locking-up" and not moving in response to aerodynamic loads on the seal. The immobilized seal could experience accelerated wear and excessive heat generation during maneuver operations where the rotor surface is moving relative to the static hydrostatic seal

BRIEF DESCRIPTION

Disclosed is a hydrostatic seal configured to be disposed between relatively rotatable components. The seal includes a seal housing. The seal also includes a shoe having a first axially extending segment, a second axially extending segment, and a radially extending segment joining the first and second axially extending segments, the shoe cantilevered to the seal housing.

In addition to one or more of the features described above, or as an alternative, further embodiments may include that the first axially extending segment is located radially outward of the second axially extending segment, the first axially extending segment cantilevered to the seal housing.

In addition to one or more of the features described above, or as an alternative, further embodiments may include that the first axially extending segment is cantilevered to the seal housing at a forward end of the first axially extending segment.

In addition to one or more of the features described above, or as an alternative, further embodiments may include that a forward end of the second axially extending segment is a free end.

In addition to one or more of the features described above, or as an alternative, further embodiments may include that the shoe is a C-shaped structure.

In addition to one or more of the features described above, or as an alternative, further embodiments may include that the first and second axially extending segments deflect during operation of the seal and the radially extending segment bends during operation of the seal.

In addition to one or more of the features described above, or as an alternative, further embodiments may include that the first axially extending segment is cantilevered to the seal housing at an aft end of the first axially extending segment.

In addition to one or more of the features described above, or as an alternative, further embodiments may include that an aft end of the second axially extending segment is a free end.

In addition to one or more of the features described above, or as an alternative, further embodiments may include that the shoe includes at least one tooth projecting radially away from a sealing surface of the shoe.

Also disclosed is a seal assembly disposed in a gas turbine engine. The seal assembly includes a first component. The seal assembly also includes a second component, the first component and the second component relatively rotatable components. The seal assembly further includes a first hydrostatic seal disposed between the first component and the second component. The seal includes a seal housing. The seal also includes a C-shaped shoe having a first axially extending segment, a second axially extending segment, and a radially extending segment joining the first and second axially extending segments, the shoe cantilevered to the seal housing.

In addition to one or more of the features described above, or as an alternative, further embodiments may include that the first axially extending segment is located radially outward of the second axially extending segment, the first axially extending segment cantilevered to the seal housing.

In addition to one or more of the features described above, or as an alternative, further embodiments may include that the first axially extending segment is cantilevered to the seal housing at a forward end of the first axially extending segment.

In addition to one or more of the features described above, or as an alternative, further embodiments may include that a forward end of the second axially extending segment is a free end.

In addition to one or more of the features described above, or as an alternative, further embodiments may include that the first and second axially extending segments deflect during operation of the seal and the radially extending segment bends during operation of the seal.

In addition to one or more of the features described above, or as an alternative, further embodiments may include that the first axially extending segment is cantilevered to the seal housing at an aft end of the first axially extending segment.

In addition to one or more of the features described above, or as an alternative, further embodiments may include that an aft end of the second axially extending segment is a free end.

In addition to one or more of the features described above, or as an alternative, further embodiments may include that the shoe includes at least one tooth projecting radially away from a sealing surface of the shoe.

In addition to one or more of the features described above, or as an alternative, further embodiments may include that the first component is a stator and the second component is a rotor, the seal operatively coupled to the stator.

In addition to one or more of the features described above, or as an alternative, further embodiments may include that the first component is a stator and the second component is a rotor, the seal operatively coupled to the rotor.

Further disclosed is a gas turbine engine including a compressor section, a combustor section, a turbine section, and a seal assembly disposed in the gas turbine engine, the seal assembly comprising a stator, a rotor, and a first hydrostatic seal disposed between a stator and the rotor. The seal includes a seal housing. The seal also includes a C-shaped shoe having a first axially extending segment, a second axially extending segment, and a radially extending segment joining the first and second axially extending segments, the shoe cantilevered to the seal housing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
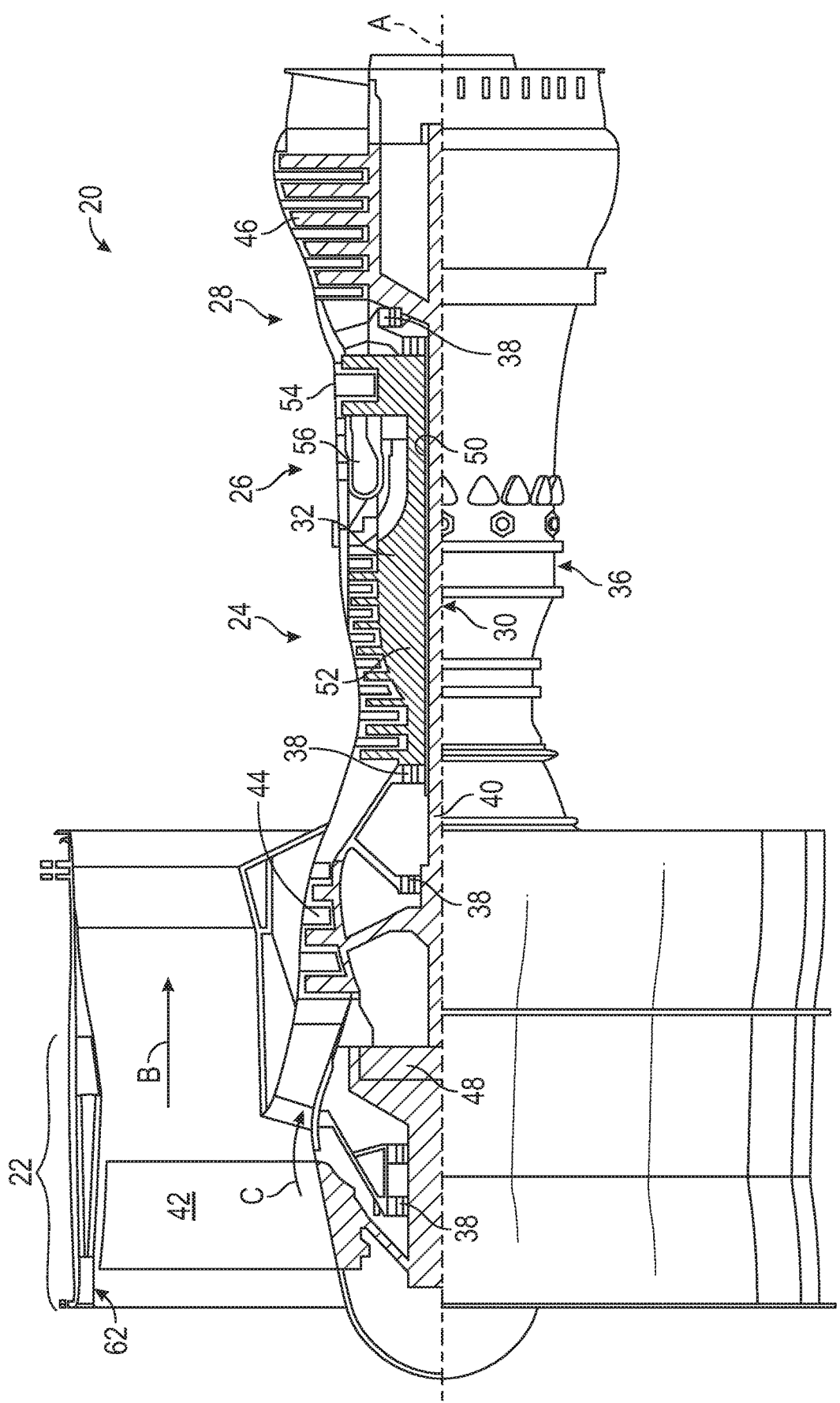
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
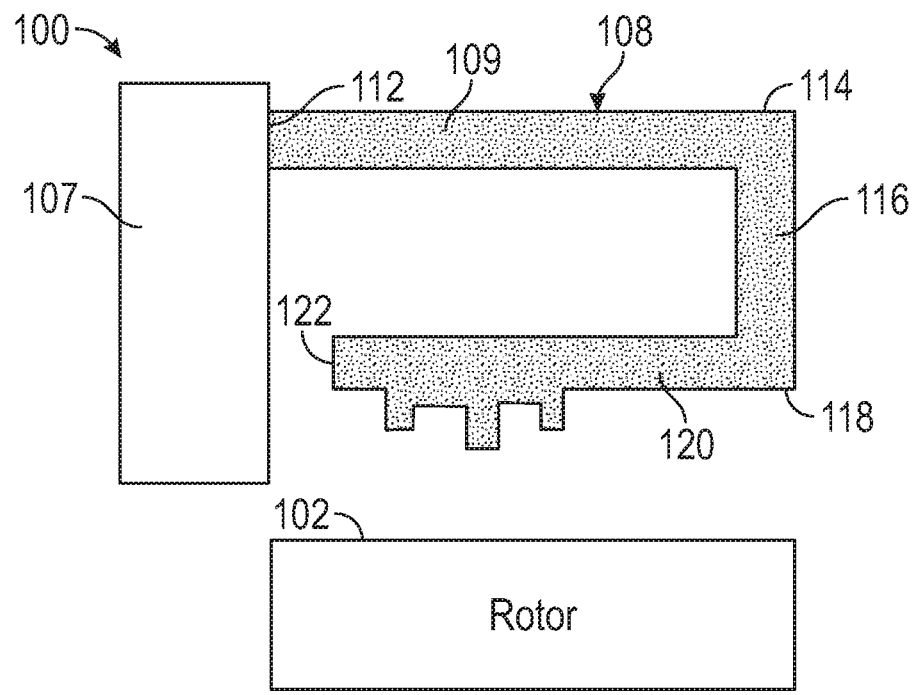
FIG. 2 is a side, elevational, cross-sectional view of a hydrostatic seal assembly in an first condition.
Figure 3:
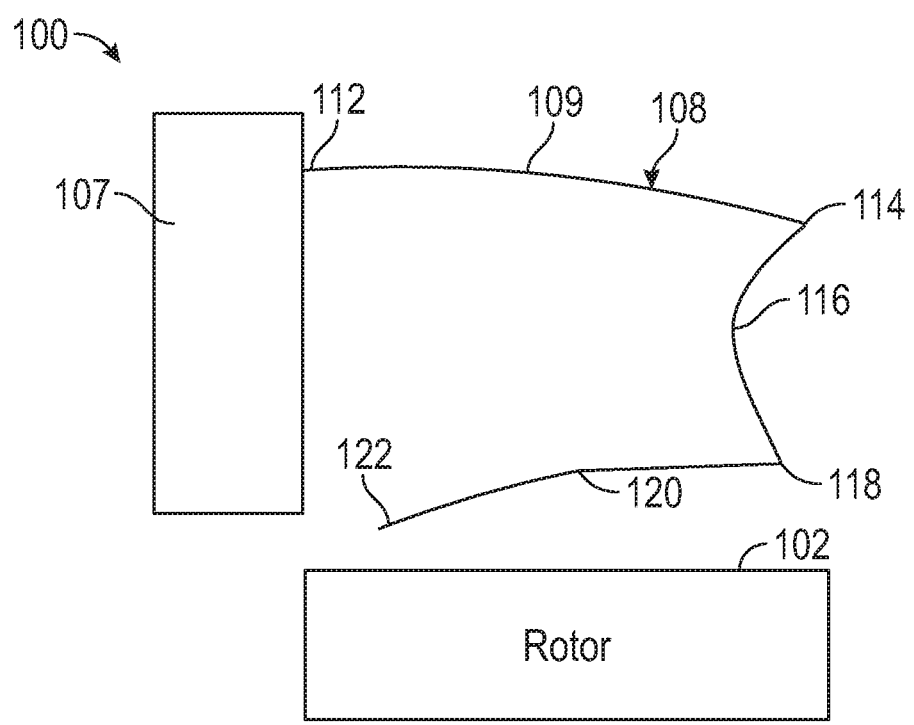
FIG. 3 is a side, elevational, schematic view of the hydrostatic seal assembly in a second condition.

FIGS. 2 and 3 illustrate a hydrostatic seal assembly indicated generally at 100. The hydrostatic seal assembly 100 is intended to create a seal between two relatively rotating components, such as a fixed stator and a rotating rotor 102. The hydrostatic seal assembly 100 includes a housing 107 and an articulating seal 108, which is located in a non-contact position along the exterior surface of the rotor 102. The seal 108 is a substantially U-shaped structure in the illustrated embodiment, but it is to be appreciated that the seal 108 may have other geometries in alternative embodiments.

For purposes of the present disclosure, the term "axial" or "axially spaced" refers to a direction along the rotational axis of the rotor, whereas "radial" refers to a direction perpendicular to the rotational axis of the rotor. The Figures illustrate axial direction x, radial direction r.

Rather than relying on a spring element to counterbalance the aerodynamic forces generated on the seal 108 by an airflow, the embodiments described herein include a cantilevered seal. Therefore, the seal 108 is connected to the housing 107 of the seal assembly 100 in a pinned manner or some suitable alternative mechanical fastener that allows pivoting movement of the seal 108, relative to the housing 107. The housing 107 is fixed to a static structure. In the illustrated embodiment, the seal 108 includes a first segment 109 extending axially rearward from a first end region 112 to a second end region 114, a second segment 116 extending radially inwardly from the second end region 114 to a third end region 118, and a third segment 120 extending axially forward from the third end region 118 to a fourth end region 122. In the illustrated example, the seal 108 is pinned (i.e., cantilevered) to the housing 107 at the first end region 112 of the first segment 109 of the seal, while the fourth end region 122 of the third segment 120 is free and not by design in contact with any other structure.

In the illustrated embodiment, the front end of the seal 108 is coupled to a radially extending portion of the housing 107, however, it is contemplated that the U- or C-shaped seal 108 is reversed in other embodiments, such that the seal 108 is cantilevered at an aft end to a portion of the housing 107 that is located aft of the seal 108. Regardless of the precise orientation of the seal 108 and the coupling location of the seal 108 to the housing 107, the seal 108 is an articulating seal that deflects along each of the three segments 109, 116, 120. In particular, the seal 108 is shown in a first condition in FIG. 2, with no deflection of the seal present, while FIG. 3 depicts a deflection profile of the seal 108 in a second condition. As shown, when cantilevered at an upstream portion of the housing 107, the first segment 109 (i.e., top portion) of the seal 108 and the third segment 120 (i.e., bottom portion) of the seal each deflect in the second operating condition, while the seal 108 bends along the second segment 116 (i.e., radial segment). Such configurations provide an articulating seal that is stiffer and can thus be made axially shorter, when compared to other seal designs, including other cantilevered seals.

The embodiments of the hydrostatic seal 100 described herein are frictionless and are more robust to wear, when compared to prior hydrostatic seals that have contact between stationary and moving components that, due to friction, can cause the shoe to become fully or partially pinned in place and be unable to avoid contact with the rotor during a transient maneuver. The seal 100 described herein is designed to eliminate rotor contact. Frictional loads are difficult to characterize and can change over the life of the seal and lead to flutter. The embodiments described herein avoid such problems.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hydrostatic seal configured to be disposed between relatively rotatable components, the seal comprising: a seal housing; and a shoe having a first axially extending segment, a second axially extending segment, and a radially extending segment joining the first and second axially extending segments, the shoe cantilevered to the seal housing, wherein the first axially extending segment, the second axially extending segment, and the radially extending segment are formed as a single unitary structure and the first axially extending segment is radially fixed to the seal housing.

2. The seal of claim 1, wherein the first axially extending segment is located radially outward of the second axially extending segment, the first axially extending segment cantilevered to the seal housing.

3. The seal of claim 2, wherein the first axially extending segment is cantilevered to the seal housing at a forward end of the first axially extending segment.

4. The seal of claim 2, wherein a forward end of the second axially extending segment is a free end.

5. The seal of claim 1, wherein the shoe is a C-shaped structure.

6. The seal of claim 1, wherein the first and second axially extending segments deflect during operation of the seal and the radially extending segment bends during operation of the seal.

7. The seal of claim 2, wherein the first axially extending segment is cantilevered to the seal housing at an aft end of the first axially extending segment.

8. The seal of claim 7, wherein an aft end of the second axially extending segment is a free end.

9. The seal of claim 1, wherein the shoe includes at least one tooth projecting radially away from a sealing surface of the shoe.

10. A seal assembly disposed in a gas turbine engine, the seal assembly comprising:
 a first component;
 a second component, the first component and the second component relatively rotatable components; and
 a first hydrostatic seal disposed between the first component and the second component, the seal comprising:
  a seal housing; and
  a C-shaped shoe having a first axially extending segment, a second axially extending segment, and a radially extending segment joining the first and second axially extending segments, wherein the first axially extending segment, the second axially extending segment, and the radially extending segment are formed as a single unitary structure and the shoe is cantilevered to the seal housing and wherein the first axially extending segment is radially fixed to the seal housing.

11. The seal assembly of claim 10, wherein the first axially extending segment is located radially outward of the second axially extending segment, the first axially extending segment cantilevered to the seal housing.

12. The seal assembly of claim 11, wherein the first axially extending segment is cantilevered to the seal housing at a forward end of the first axially extending segment.

13. The seal assembly of claim 11, wherein a forward end of the second axially extending segment is a free end.

14. The seal assembly of claim 10, wherein the first and second axially extending segments deflect during operation of the seal and the radially extending segment bends during operation of the seal.

15. The seal assembly of claim 11, wherein the first axially extending segment is cantilevered to the seal housing at an aft end of the first axially extending segment.

16. The seal assembly of claim 10, wherein an aft end of the second axially extending segment is a free end.

17. The seal assembly of claim 10, wherein the shoe includes at least one tooth projecting radially away from a sealing surface of the shoe.

18. The seal assembly of claim 10, wherein the first component is a stator and the second component is a rotor, the seal operatively coupled to the stator.

19. The seal assembly of claim 10, wherein the first component is a stator and the second component is a rotor, the seal operatively coupled to the rotor.

20. A gas turbine engine comprising:
a compressor section;
a combustor section;
a turbine section; and
a seal assembly disposed in the gas turbine engine, the seal assembly comprising a stator, a rotor, and a first hydrostatic seal disposed between a stator and the rotor, the seal comprising:
a seal housing; and
a C-shaped shoe having a first axially extending segment, a second axially extending segment, and a radially extending segment joining the first and second axially extending segments, wherein the first axially extending segment, the second axially extending segment, and the radially extending segment are formed as a single unitary structure and the shoe is cantilevered to the seal housing and wherein and the first axially extending segment is radially fixed to the seal housing.

* * * * *